(12) United States Patent
Higa

(10) Patent No.: US 7,952,498 B2
(45) Date of Patent: May 31, 2011

(54) HAPTIC COMPUTER INTERFACE

(75) Inventor: George Higa, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1005 days.

(21) Appl. No.: 11/771,665

(22) Filed: Jun. 29, 2007

(65) Prior Publication Data

US 2009/0002140 A1      Jan. 1, 2009

(51) Int. Cl.
*H03M 11/00* (2006.01)

(52) U.S. Cl. ............... 341/34; 341/20; 341/22; 345/173; 345/168; 345/176; 715/702; 715/716

(58) Field of Classification Search .................... 341/20, 341/22, 34; 345/173, 176, 168; 715/702, 715/716, 771, 851

See application file for complete search history.

(56) References Cited

U.S. PATENT DOCUMENTS

| 6,211,856 B1 * | 4/2001 | Choi et al. ............... 345/666 |
| 2003/0231197 A1 * | 12/2003 | Janevski ............... 345/702 |

* cited by examiner

*Primary Examiner* — Albert K Wong

(57) ABSTRACT

A method and system of an embodiment may include a system comprising a touch screen display panel, and a tactile panel with one or more raised surfaces wherein the touch screen display panel is positioned on top of the tactile panel and the tactile panel creates one or more raised surfaces on the touch screen display panel providing tactile information to a user of the touch screen display panel.

21 Claims, 5 Drawing Sheets

HAPTIC COMPUTER INTERFACE

BACKGROUND INFORMATION

Touch screens have become an increasingly popular interface for a variety of devices. The ability of the touch screen to display indicia corresponding to a variety of interfaces accommodates multiple user interfaces through a single compact device. This allows different interfaces to be displayed for compact mobile devices such as cell phones, personal digital assistants (PDAs), digital audio players and other devices. These devices are designed to be mobile and are frequently used in transit such as while a user is driving, walking, running and under other challenging conditions. The use of a touch screen generally provides a flat surface with no tactile feedback to a user. The touch screen thus requires a user to look at the display of the touch screen in order to determine the positioning of displayed keys, buttons and other controls. The required viewing of the touch screen controls can be especially demanding if a user is attempting to control a device while a user is driving, running, working out or engaged in other activities which require the user's attention.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a haptic computer interface which provides tactile feedback allowing a user of the interface to sense by touch one or more interface input controls. The haptic computer interface may enable a user of a touch screen interface to identify and distinguish one or more controls of the interface without visual confirmation by the user.

Figure 1:
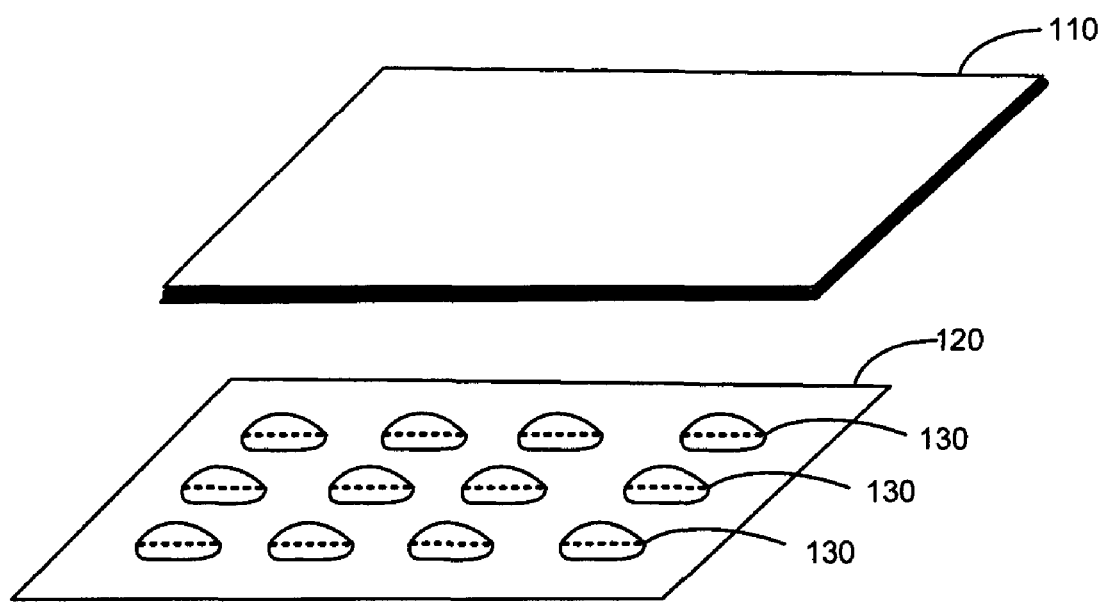
FIG. 1 is a haptic computer interface, according to an exemplary embodiment.

FIG. 1 is an haptic computer interface, according to an exemplary embodiment. Display 110 may represent an organic light emitting diode display such as a polymer light emitting diode or another display capable of being constructed on a flexible substrate. Display 110 may also contain touch screen functionality such as a resistive touch screen panel, a capacitive touch screen panel or other touch screen technologies to accept input from a user. Alternatively display 110 may function simply as a display without detecting user input.

Tactile panel 120 may contain one or more buttons 130. In one or more embodiments, tactile panel 120 may be composed of a flexible material or membrane which may contain portions raised by one or more actuators to create one or more buttons 130. Tactile panel 120 may be composed of a material such as rubber, plastic or other materials containing one or more portions preformed to create one or more buttons 130. When combined with display 110, buttons 130 of tactile panel 120 may cause display 110 to contain one or more raised portions. The resulting one or more raised portions may correspond to controls in the display. The number, shape, functionality, behavior and other attributes of the raised portions may vary according to the desired controls of the interface. In one or more embodiments, a device using the haptic computer interface may vary the number and/or the position of raised portions dynamically using actuators to raise or lower one or more buttons 130. For example, a device may present 12 or more buttons for a standard telephone interface, or may present 6 buttons for a media player interface.

In other embodiments, tactile panel 120 may be composed of a rigid material with one or more openings. When combined with display 110, tactile panel 120 may cause display 110 to contain one or more depressions in the surface of the display which may indicate the positioning of controls.

One or more buttons 130 may depress when force is applied to them by a user and may provide tactile feedback to the user that a button has been successfully pressed. In one or more embodiments, buttons 130 may not depress and may serve only as a positioning guide for a user to determine the position of controls on display 110 without using visual confirmation. In one or more embodiments, buttons 130 may be depressions in the surface of display 110. Buttons 130 may be rounded dome shaped buttons, oval buttons, rectangular buttons, or other shapes providing tactile feedback to the user of the interface.

The controls of the haptic computer interface may be contained in a touch screen which may be resistive touch screen panel, a capacitive touch screen panel or other touch screen technology built into display 110. In some embodiments, buttons 130 may be present for tactile feedback only and user input may be accepted by touch screen functionality of display 110. In one or more embodiments, one or more buttons 130 may activate a corresponding switch and the display 110 may not contain touch screen technology. In other embodiments, buttons 130 may accept input when pressed and display 110 may also contain touch screen technology. In such embodiments, a user may press lightly on a button and the touch screen may signal one input. Pressing harder on the button may depress the button and cause a second input. The two inputs may correspond to different functionalities. For example, a light touch on a button which may only register on a touch screen may signal a click on an object in the display. A harder touch may depress the button and may signal a double click on an object in the display.

Buttons, raised surfaces, or indentations may be caused by the raising or lowering of one or more surfaces in a tactile feedback layer. The one or more surfaces may be raised or lowered in response to a command from a controller which may signal a servomechanism or servo to raise or lower one or more surfaces. For example a servo may use a motor and one or more actuators to raise or lower one or more surfaces.

The various components as shown in FIG. 1 may be further duplicated, combined and/or integrated to support various applications and platforms. Additional elements may also be implemented in the systems described above to support various applications.

Figure 2:
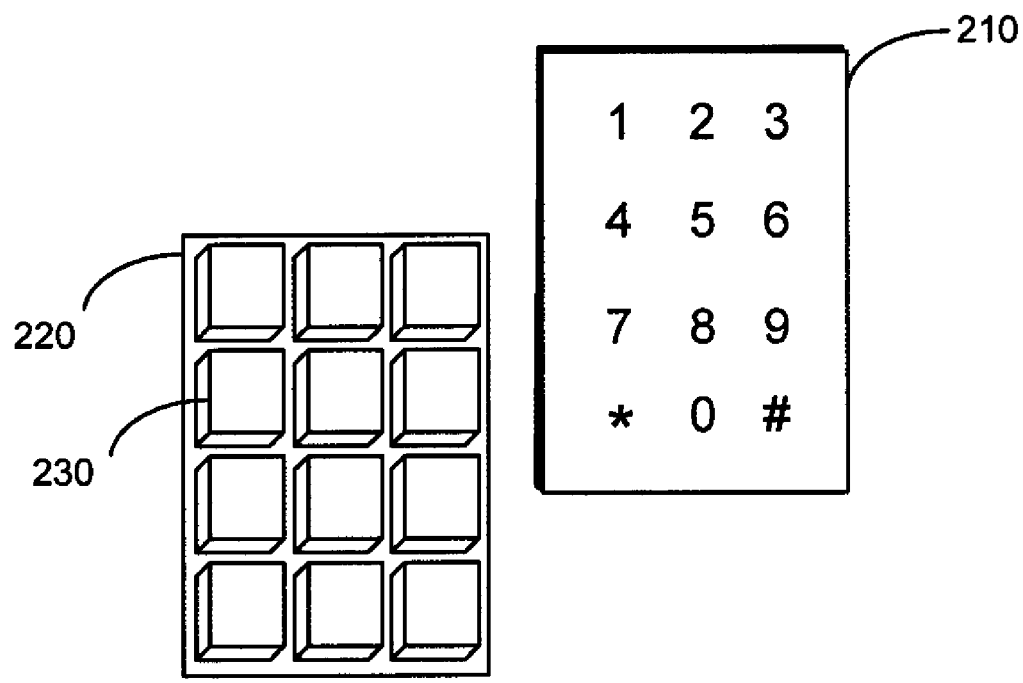
FIG. 2 is a haptic computer interface, according to an exemplary embodiment.

FIG. 2 is a haptic computer interface, according to an exemplary embodiment. Display 210 may represent an organic light emitting diode display such as a polymer light emitting diode or another display capable of being constructed on a flexible substrate. Display 210 may also contain touch screen functionality such as a resistive touch screen panel, a capacitive touch screen panel or other touch screen technologies to accept input from a user. Alternatively display 210 may function simply as a display without detecting user input.

Tactile panel 220 may contain one or more buttons 230. Tactile panel 220 when overlaid by display 210 may create one or more raised surfaces in display 210. Display 210 may display indicia or other indicators over the one or more buttons 230 which may correspond to functionality of the one or more buttons 230. Once a user has learned the functionality corresponding to the one or more buttons 230, the user may memorize the location, size, texture or other tactile indicators of the one or more buttons 230. A user may then use these tactile indicators to navigate the functionality of the touch screen without requiring visual navigation. Additionally, tactile panel 220 may contain one or more retractable buttons 230 so that different patterns of buttons may be presented to a user for different functionalities of a device, different preferences of a user or for other purposes. For example, buttons may be presented in a row for a traditional layout of a digital media player to present options to play the media, stop the media, rewind the media or fast forward the media. These buttons may be presented to a user for easy access while the touch screen of display 210 may enable more detailed controls such as media selection, equalizer controls, video editing or other options. Positioning of the buttons may be designed to increase ease of use of the interface such as by positioning related buttons near one another. For example, a first button that detects pressure may be used to increase a setting while a related button that detects pressure to decrease a setting may be positioned next to the first button.

Different behaviors of buttons may also be present. A button may also act as a rocker switch or as a pointing stick by allowing a user to depress one side of a button at a time. This may allow a user to use a button to increase or decrease a setting, to navigate or scroll through selections or to perform other functionality. A button may also respond to differing amounts of pressure applied to it. In one or more embodiments, a light pressure may correspond to a lower setting of a corresponding control while a heavier pressure applied by a user may correspond to a higher setting. For example, this could correspond to the speed of an operation such as the speed of fast forwarding or rewinding digital media, the speed of scrolling, the number of records, selections or files to skip or other operations with variable speeds.

Because the buttons may be retractable and the labeling or corresponding indicia of the buttons may be displayed by display 210 the interface may maintain the flexibility of the touch screen interface and may additionally provide haptic feedback for a user. One or more portions of an interface may be customizable by a user. For example, a user may able to assign one or more buttons 230 for the most commonly used or user preferred functions and display 210 may display indicia corresponding to the functions for the assigned buttons. In one or more embodiments, a user may be able to specify two or more functions for a button. For example, the first function may be performed when a user touches a button within a certain range of pressure that may be detected by a touch screen of display 210. The second function may be performed when the button is pressed with a greater amount of pressure causing the button to recede. This may be detected by a switch connected to an actuator associated with the button.

Figure 3:
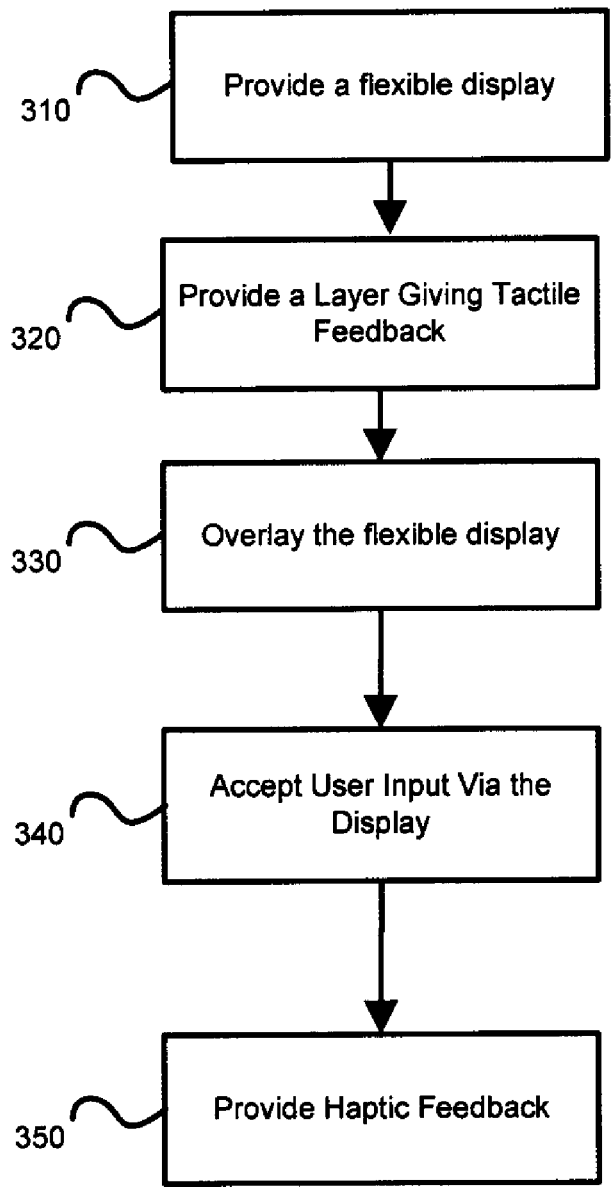
FIG. 3 is a flowchart depicting a method for providing haptic computer interface, according to an exemplary embodiment.

FIG. 3 is a flowchart depicting a method for providing haptic computer interface, according to an embodiment. At block 310, a flexible display may be provided. In one or more embodiments, it may be one or more touch screen displays. In other embodiments it may be a display without touch screen functionality.

At block 320 a layer may be provided giving tactile feedback to a user of the display. This may be accomplished simply by providing a layer with one or more raised surfaces. In one or more embodiments this may be a layer that contains one or more buttons. The buttons may remain raised continuously unless pressed by a user or the buttons may be raised dynamically to accommodate a specific interface. For example, if a user selects telephone functionality via a touch screen menu buttons may be raised corresponding to a traditional phone keypad. Buttons may also be raised or lowed corresponding to other user actions or actions of system using the display. For example, if a device using the display has headphones plugged into it or other peripherals attached it may signal the interface to present buttons for a corresponding control menu. If a display is embedded in a device with a cover, buttons may raise or retract if a cover is opened or closed. In one or more, embodiments buttons may be presented according to a user preference. A user may set the buttons to be raised when driving or running with a device and may change the preference so that they may use a touch screen without tactile feedback when they are at home or work.

In block 330, the flexible display may be overlaid on top of the tactile feedback layer. The overlaying of the flexible display on the tactile feedback layer may cause the display to contain one or more raised surfaces and/or one or more indentations.

In block 340, a user of the flexible display may enter input. Input may be entered using a touch screen, buttons, other raised surfaces, or a combination of these methods.

In block 350, the user interface may provide haptic feedback to a user. A user may receive tactile feedback by the raised surfaces or recessed surfaces of one or more buttons. In one or more embodiments a user may also receive haptic feedback when pushing one or more buttons. One or more buttons may recess when pressed, may tilt when pressed, may vibrate when pressed, or may provide other forms of haptic feedback. In one or more embodiments, raised portions of a display may recess only enough to provide haptic feedback to a user to confirm that a selection has been made.

In some embodiments, a user may be provided confirmation of a selection by a vibration, or other haptic indicator. Vibration may be provided by a vibrating actuator connected to the display. A touch screen may sense a user's touch and may signal a controller which may activate a vibrating actuator to give a haptic confirmation of the user's touch. In one or more embodiments, a button may raise in response to a selection on a touch screen and may provide a tactile confirmation of a selection. A button may remain recessed in response to a user's selection to provide a tactile confirmation of a selection.

Figure 4:
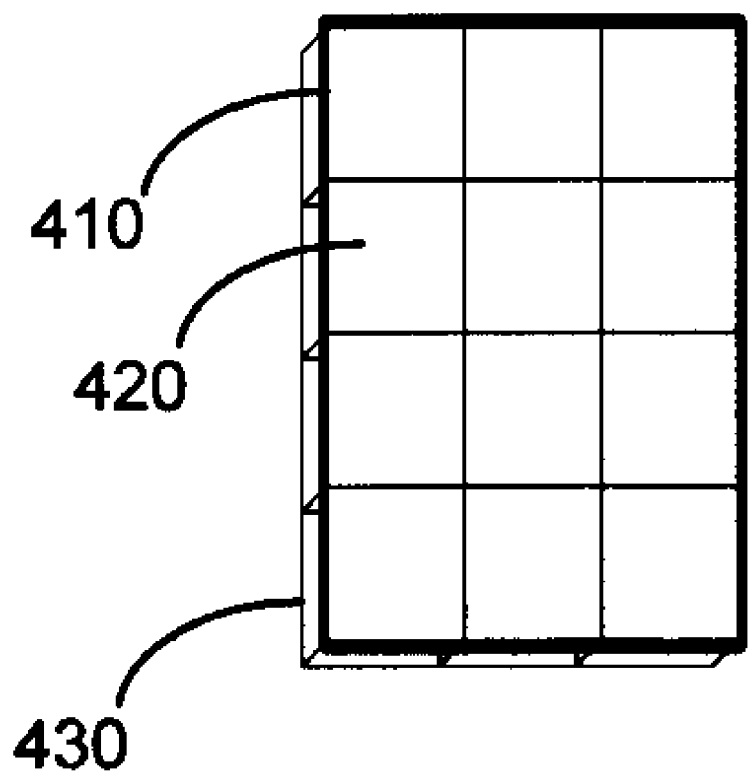
FIG. 4 is a haptic computer interface, according to an exemplary embodiment.

FIG. 4 is a haptic computer interface, according to an exemplary embodiment. Display 410 may contain one or more aligned screen panels 420 which may be capable of being pushed by a user. The screen panels 420 may be closely aligned and may be capable of providing a display which may appear continuous and uniform. Screen panels 420 may correspond to one or more buttons 430. One or more of the screen panels 420 may be capable of receding when pushed by a user and may thus provide confirmation of the user's selection. Additionally, one or more screen panels 420 may be capable of being raised or lowered so that they may arranged in a staggered height which is perceptible to the user's touch. For example, alternating screen panels 420 may be raised or lowered to differentiate controls to a users touch, a center panel may be raised or lowered, two adjacent screen panels 420 may be raised or lowered to indicate an up or down button on a setting, or other arrangements may be provided to give a tactile indication of the available functionality.

Screen panels 420 may contain one or more displays on the surface of a screen panel. For example, screen panels 420 may contain organic light emitting diode displays or other light emitting diode displays. Screen panels 420 may be liquid crystal displays or other suitable display technologies. Screen panels 420 may contain a transparent, scratch resistant layer on top which may protect a screen panel and may be composed of a clear, scratch resistant polymer or other material. The displays may show an individual display or they may show a portion of a larger display which may be shown by display 410. The screen panels 420 may be connected to a central controller which may provide for the synchronized display of a uniform image on display 410.

Screen panels 420 may be a top portion of one or more buttons 430. They may be functionally connected via one or more actuators to one or more buttons 430. Buttons 430 may recess when pressed by a user which may provide haptic feedback indicating that a button has been pressed. In some embodiments, visual and audio indicators may provide feedback to a user that a button has been pressed. For example, a click or other sound may be provided when a button is pressed. This may be provided by an actuator or the button operatively coupled to one or more screen panels 420. Display 410 may provide visual confirmation that a selection has been made.

Figure 5:
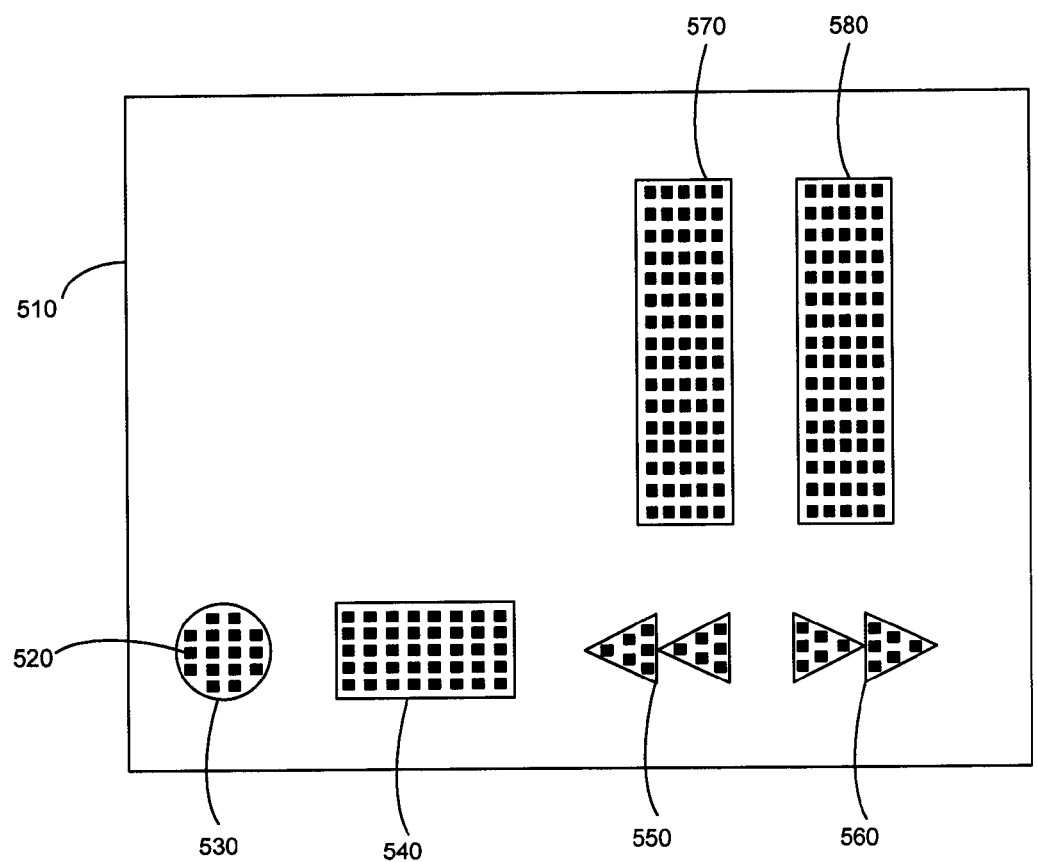
FIG. 5 is a haptic computer interface, according to an exemplary embodiment.

FIG. 5 is a haptic computer interface, according to an exemplary embodiment. Display 510 may contain one or more buttons. Buttons may be created dynamically by one or more actuators which may raise a surface of the display 510. Button contact points 520 may be raised independently by one or more actuators to form one or more raised surfaces on display 510. Button contact points 520 may be operatively coupled to one or more switches which may accept input when one or more button contact points 520 are pressed by a user. In one or more embodiments, button contact points may be raised to provide tactile feedback to a user of display 510. Display 510 may contain a touch screen which may accept user input. Button contact points 520 may represent a single input or may represent multiple inputs. For example, one or more controllers may be connected to one or more switches operatively coupled to button contact points 520. The one or more controllers may accept input from switches connected to button contact points 520 as if they represent input from a single button. The one or more controllers may also accept input from switches connected to button contact points 520 as individual input and may interpret input to indicate a selection specific to an area represented by individual button contact points 520. For example, pressing in one area of display 510 may represent a middle level setting on a range, pressing higher on display 510 may push different button contact points 520 and may represent a higher setting on a range.

Multiple button shapes may be presented in a single interface to provide a tactile guide as to the functionality of the button. For example, a play button on the interface of a digital media player may be larger or may be of a different shape than a rewind or fast forward control button. Returning to FIG. 5, the shapes may be presented by one or more controllers activating one or more actuators to raise one or more button contact points 520. Stop button 530 may represent a stop button on a digital media player and the circular shape may provide haptic feedback enabling a user to stop the play of audio files without looking at the display to locate the stop button. Stop button 530 may be presented by one or more controllers which may signal actuators to raise button contact points 520 in a circular pattern. Play button 540 may represent a play button and the rectangular shape may provide haptic feedback enabling a user to easily locate the button and differentiate the functionality of the button from other buttons. Rewind button 550 may represent a rewind button and may provide yet another shape whose shape may represent a common symbol for the corresponding functionality of rewinding media. In this case, the double left pointing arrows may already be associated by a user with rewind functionality. Fast Forward button 560 may represent a fast forward button and may correspond to functionality fast forwarding media. First setting button 570 and second setting button 580 may represent controls which correspond to a settings with a range of permissible values for a particular user interface. For example, first setting button 570 and second setting 580 may correspond to the volume settings for a left and right speaker, bass and treble settings, video contrast and brightness or other settings. Pressing one end of button first setting 570 or second setting 580 may lower the setting, pressing in a middle portion may place the setting at a medium level, pressing at the other end of first setting button 570 or second setting 580 may raise the setting. Button contact points 520 throughout first setting button 570 and second setting 580 may accept input individually so that only that portion of the raised display 510 touched by a user recesses. The setting represented by first setting button 570 or second setting 580 may be adjusted within its range according to the portion of first setting button 570 or second setting 580 which is pressed. In addition to ranges, which portion of a button pressed may indicate direction, the desired portion of a spectrum, a desired frequency or other inputs which may be indicated by a variance of the selection position.

One or more buttons may be labeled by display 510. Display 510 may label buttons with indicia corresponding to functionality of a button or corresponding to a current setting value of the button. For example, display 510 may indicate that first setting button 570 is currently set to a volume of five on a range of 1-10 for a left speaker while second setting button 580 is set to eight on a range of 1-10 for a right speaker. Labels on one or more buttons of display 510 may enable a user to learn new interfaces until they gain familiarity with the haptic feedback provided by the interface. Buttons may present raised surfaces and may unlabeled allowing for a uniform display to be presented across all of display 510 including the raised surfaces of one or more buttons.

In the preceding specification, various preferred embodiments have been described with reference to the accompanying drawings. It will, however, be evident that various modifications and changes may be made thereto, and additional embodiments may be implemented, without departing from the broader scope of the specification and the claims as set forth below. The specification and drawings are accordingly to be regarded in an illustrative rather than restrictive sense.

The invention claimed is:
1. A system comprising:
a touch screen display panel; and
a tactile panel with one or more raised surfaces wherein the touch screen display panel is positioned on top of the tactile panel and the tactile panel creates one or more raised surfaces on the touch screen display panel providing tactile information to a user of the touch screen display panel, wherein at least one of the one or more raised surfaces provides different outputs according to a level of pressure applied by the user.

2. The system of claim 1 wherein the touch screen display panel is an organic light emitting diode display panel.

3. The system of claim 1 wherein the raised surfaces recess in response to a force applied by a user and return to a raised position when the force is removed.

4. The system of claim 1 wherein the raised surfaces are dome shaped.

5. The system of claim 1 wherein the raised surfaces are square.

6. The system of claim 1 wherein the tactile panel is comprised of a flexible membrane layer allowing a user to depress one or more of the raised surfaces.

7. The system of claim 1 wherein the one or more raised surfaces approximate a keyboard.

8. The system of claim 1 wherein the one or more raised surfaces approximate a keypad.

9. The system of claim 1 wherein one or more of the raised surfaces is retractable and the number of raised surfaces on the touch screen display panel is variable.

10. The system of claim 9 wherein the number of raised surfaces is varied according to the use of the touch screen display panel.

11. A method, comprising:
providing a touch screen display panel; and
providing a tactile panel with one or more raised surfaces wherein the touch screen display panel is positioned on top of the tactile panel and the tactile panel creates one or more raised surfaces on the touch screen display panel providing tactile information to a user of the touch screen display panel, wherein at least one of the one or more raised surfaces provides different outputs according to a level of pressure applied by the user.

12. The method of claim 11 wherein the touch screen display panel is an organic light emitting diode display panel.

13. The method of claim 11 wherein the raised surfaces recess in response to a force applied by a user and return to a raised position when the force is removed.

14. The method of claim 11 wherein the raised surfaces are dome shaped.

15. The method of claim 11 wherein the raised surfaces are square.

16. The method of claim 11 wherein the tactile panel is comprised of a flexible membrane layer allowing a user to depress one or more of the raised surfaces.

17. The method of claim 11 wherein the one or more raised surfaces approximate a keyboard.

18. The method of claim 11 wherein the one or more raised surfaces approximate a keypad.

19. The method of claim 11 wherein one or more of the raised surfaces is retractable and the number of raised surfaces on the touch screen display panel is variable.

20. The method of claim 19 wherein the number of raised surfaces is varied according to the use of the touch screen display panel.

21. A system comprising:
a touch screen display panel; and
one or more push button switches wherein the touch screen display panel is positioned on top of the one or more push button switches and the one or more push button switches create one or more raised surfaces on the touch screen display panel providing tactile information to a user of the touch screen display panel, wherein at least one of the one or more raised surfaces provides different outputs according to a level of pressure applied by the user.

\* \* \* \* \*